No. 617,403. Patented Jan. 10, 1899.
J. H. MASTERS.
PLANT SETTER.
(Application filed June 20, 1898.)
(No Model.) 2 Sheets—Sheet 1.
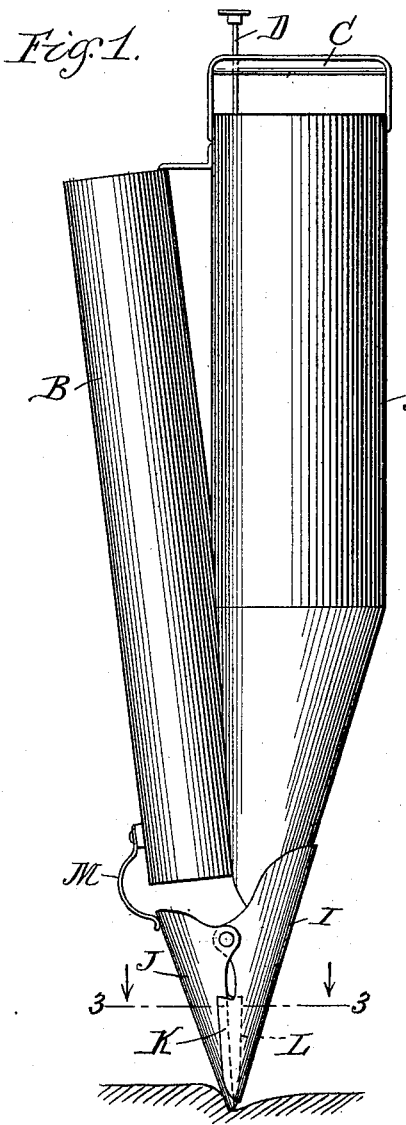
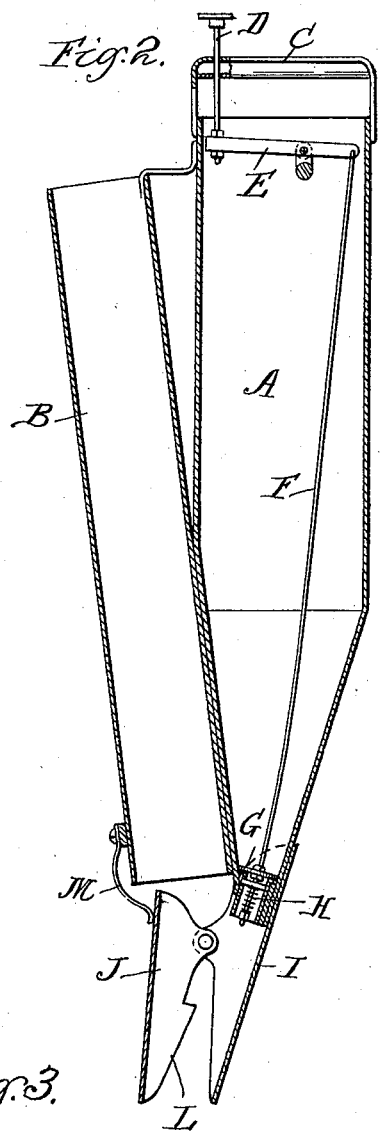
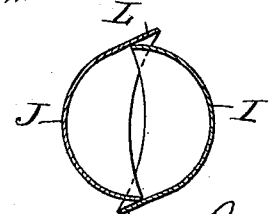
Witnesses.
Wm. M. Rheem.
Harold J. Barrett.
Inventor
Joseph H. Masters
by Raymond & Onohundro
Atty's.
THE NORRIS PETERS CO., PHOTO-LITHO., WASHINGTON, D. C.

No. 617,403. Patented Jan. 10, 1899.
J. H. MASTERS.
PLANT SETTER.
(Application filed June 20, 1898.)
(No Model.) 2 Sheets—Sheet 2.
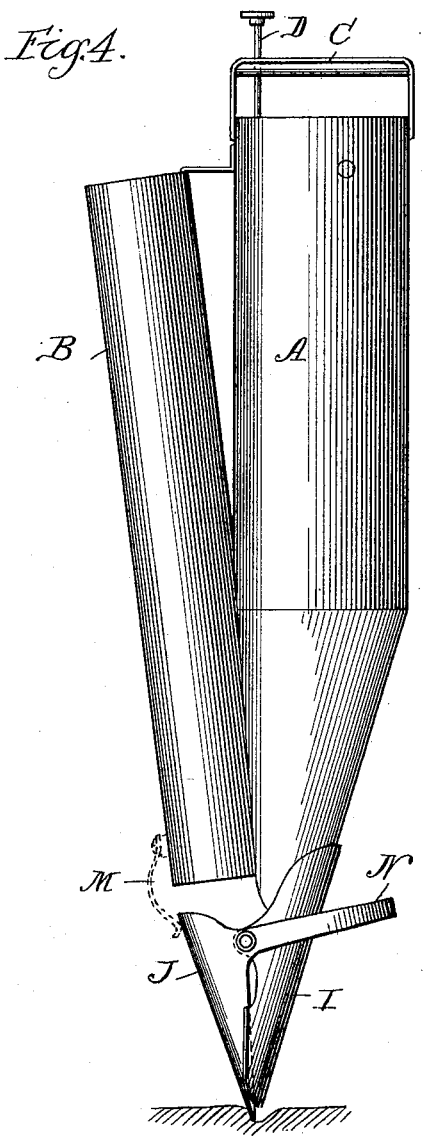
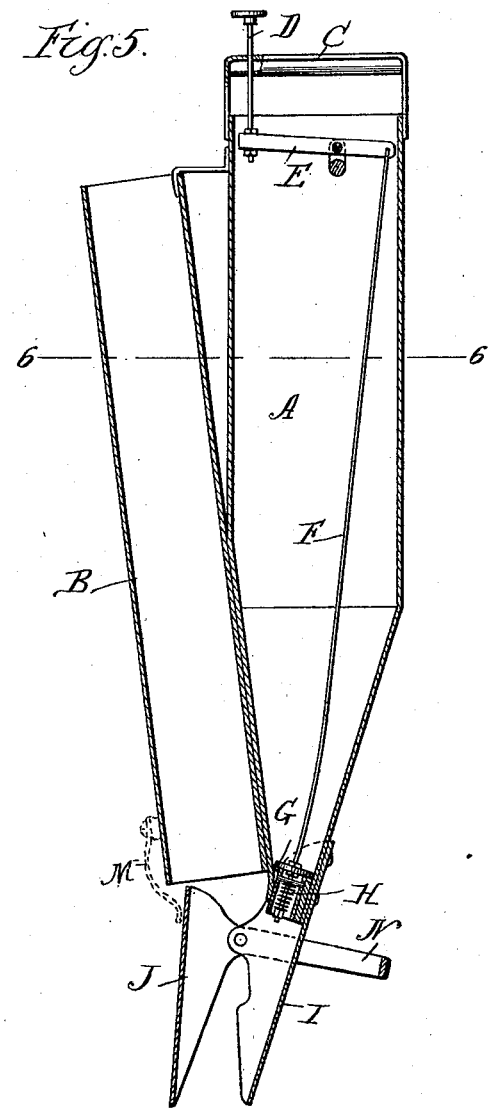
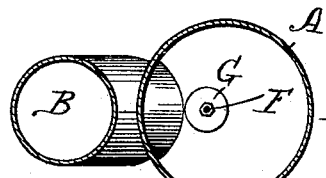

UNITED STATES PATENT OFFICE.

JOSEPH H. MASTERS, OF CHICAGO, ILLINOIS.

PLANT-SETTER.

SPECIFICATION forming part of Letters Patent No. 617,403, dated January 10, 1899.

Application filed June 20, 1898. Serial No. 683,922. (No model.)

*To all whom it may concern:*

Be it known that I, JOSEPH H. MASTERS, a citizen of the United States, residing at Chicago, in the county of Cook and State of Illinois, have invented certain new and useful Improvements in Plant-Setters, of which the following is a specification.

My invention relates to improvements in plant-setters used for setting and planting tobacco, cabbage, tomatoes, and other plants that are first sprouted and grown to an early stage of development in beds and subsequently transplanted and set in rows in the field for complete development. The difficulty in successfully setting such plants is to have them properly set a sufficient depth and the roots covered and watered without damage to the plant, this work being now practically all done by hand, so far as I am informed, which requires the planter to assume a stooping, uncomfortable, and fatiguing position and which results in irregular and uncertain planting even by such method.

The object of my invention is a portable plant-setter which enables the operator while in an upright position to form the hole for the plant, drop the plant securely and properly into the hole, water the same, and properly cover the roots thereof without injury to the plant, whereby the work of plant-setting is rendered least laborious, the danger of injury to the plant is reduced to the minimum, uniformity in the depth of planting and relative distance apart of the plants is promoted, and the number of plants set by each operator is greatly increased. These objects and such others as may hereinafter appear are attained by the devices illustrated in the accompanying drawings, in which—

Figure 1 represents a side elevation of the preferred form of plant-setter embodying my invention. Fig. 2 represents a central longitudinal section thereof. Fig. 3 represents a horizontal section on the line 3 3 of Fig. 1, looking in the direction indicated by the arrows. Fig. 4 represents a side elevation of a modified form of plant-setter embodying my invention. Fig. 5 represents a central longitudinal section thereof, and Fig. 6 represents a horizontal section on the line 6 6 of Fig. 5.

Similar letters of reference indicate the same parts in the several figures of the drawings.

Referring by letter to the accompanying drawings, A indicates a water-reservoir, and B the plant-tube, said reservoir and tube being preferably in the form of cylinders secured together side by side and at a slight angle to each other, the lower end of the reservoir being preferably tapering, so that the device as a whole is generally the shape of an inverted cone. Of course the form and arrangement of the reservoir and tube are immaterial, the only element of consequence being that they should be of such length that the operator can bring the lower ends of the tubes in contact with the ground without stooping. To this end the reservoir is provided with a handle C at its upper end for convenience of manipulation and portability, through which projects a push-rod D, intended to be depressed by the thumb of the operator. This push-rod connects with one end of a lever E, suitably pivoted in the walls of the reservoir A, which lever is in turn connected by a rod F with a valve G, closing an opening in the lower end of the reservoir, a suitable spring H being provided, the tension of which normally tends to seat the valve.

To the lower end of the reservoir is rigidly secured a semicircular tapering shovel I of sufficient length to form a hole of the required depth to receive the plant, and to this shovel is pivotally connected a companion semicircular tapering shovel J of slightly greater length than the shovel I—that is, below the pivot—so that the lower end of the pivoted shovel when the two shovels are brought together projects slightly beyond the rigid shovel. When the two shovels are brought together, as will be seen by an inspection of Fig. 1, they form approximately a hollow inverted cone, the apex of which is formed by the points of the shovels, which are thus enabled to readily penetrate the ground. The opposite side edge of each shovel, as shown in Fig. 3, is bent outward at a tangent, so as to form the lips K L, extending substantially from the lower end of each shovel to a point near the pivotal connection between the shovels or to whatever point it may be desirable to sink the shovels in the ground in setting the plant. The points of the shovels are preferably held normally separated or open by some suitable means, such as the spring M, (shown in Figs. 1 and 2,) which is secured to the plant-tube B at one end and presses at its opposite end upon the upper end of the pivoted shovel J above the pivot thereof.

In the operation of setting a plant the operator first brings the points of the shovels together in position for penetrating the ground by striking the longer point of the pivoted shovel J against the ground and pressing laterally until the shovel I is brought in contact therewith. A downward pressure is then exerted upon the handle C, so as to force the shovels into the ground to the desired depth. The whole apparatus in then rotated, and the shovels are caused to automatically spread and enlarge the hole in the ground by the engagement of the tangential extensions K and L on the opposite edges thereof with the surrounding ground. When the shovels are fully open, the operator takes the plant from some suitable receptacle carried by him and drops it into the plant-tube, by which it is guided into the hole formed by the shovels, or the plant may be dropped into the shovels before they are rotated, so as to allow the earth loosened by the tangential extensions K and L to fall on top of the roots of the plants as they sink to the bottom of the opening formed by the shovels. The operator then depresses the push-rod B, thereby unseating for an instant the valve G, so as to allow sufficient water to run directly onto the roots of the plant. The apparatus as a whole is then lifted out of the ground, the spring M acting to hold the point of the shovel J away from the shovel I and in a position substantially parallel therewith, so that the plant will not be cut or pulled out of the ground in withdrawing the shovels. The loose earth will fall around the plant and close up the hole sufficiently under ordinary conditions, although of course, if desirable, the earth may be packed around the plant by the foot or hand of the operator.

The only difference between the apparatus illustrated in Figs. 1, 2, and 3 and that illustrated in Figs. 4, 5, and 6 is that I have shown instead of the spring M for holding the shovels normally open or apart a bail or extension N on the pivoted shovel J, which may be of sufficient weight to hold the shovels normally open, this bail being also a desirable attachment where the ground is of such character that the shovels will not automatically separate when rotated in the ground. In such an event the operator will simply have to press upon the bail or extension N with his foot and forcibly separate the shovels after they are sunk in the ground.

In the practical use of my invention I have found the apparatus illustrated in Fig. 1 perfectly satisfactory under most all conditions; but at the same time I have found that sometimes the shovels will fail to automatically open, and of course in such emergency the bail or extension N becomes both useful and desirable. Indeed, I have found it desirable to have both the bail and the spring applied to the plant-setter, as illustrated by the dotted lines in Figs. 4 and 5, as they work together and the bail does not interfere with the action of the spring, but simply provides an added capability to the apparatus.

I am aware that numerous changes in the form and construction of the parts of my apparatus may be made without departing from the spirit of my invention, and all such changes are comprehended by my invention. For instance, while I have shown one of the shovels fixed and the other pivoted I do not desire to limit myself to such construction, for obviously the shovels might both be pivoted and accomplish all of the desirable results attained by my invention. Again, the plant-tube might be dispensed with and the plants placed directly between the shovels by hand, or the tube may be supplemented by an extension on the pivoted shovel, so as to answer all of the purposes of my tube, though possibly endangering the life of the plants by bruising and breaking the same.

Having thus fully described my invention, what I claim, and desire to secure by Letters Patent, is—

1. In a plant-setter, the combination with a reservoir having a valved opening in the lower end thereof, of a pair of separable tapering shovels attached to said reservoir and a plant-tube also secured to said reservoir and adapted to discharge between said shovels, substantially as described.

2. In a plant-setter, the combination with a reservoir having a valved opening in the lower end thereof, of a pair of separable tapering shovels attached to said reservoir, each of said shovels being provided with a tangential lip or extension along one edge thereof, substantially as described.

3. In a plant-setter, the combination with a reservoir having a valved opening in the lower end thereof, of a pair of separable tapering shovels attached to said reservoir, each of said shovels being provided with a tangential lip or extension along one edge thereof and means for normally separating said shovels, substantially as described.

4. In a plant-setter, the combination with a reservoir having a valved opening in the lower end thereof, of a tapering semicircular shovel rigidly secured to said reservoir and a tapering semicircular shovel pivotally secured to said first-mentioned shovel and means for normally holding the points of said shovels apart, substantially as described.

5. In a plant-setter, the combination with a reservoir having a valved opening in the lower end thereof, of a tapering semicircular shovel rigidly secured to said reservoir, a tapering semicircular shovel pivotally secured to said first-mentioned shovel and a tangential lip or extension along one side edge of each shovel, substantially as described.

6. In a plant-setter, the combination with a reservoir having a valved opening in the lower end thereof, of a tapering semicircular shovel rigidly secured to said reservoir, a tapering semicircular shovel pivotally secured to said first-mentioned shovel, a tangential lip or extension along one side edge of each shovel and means for normally separating the points of said shovels, substantially as described.

7. In a plant-setter, the combination with a reservoir having a valved opening in the lower end thereof, of a tapering semicircular shovel rigidly secured to said reservoir, a tapering semicircular shovel pivotally secured to the first-mentioned shovel and having a point extending beyond the point of the first-mentioned shovel, and means for normally holding the points of said shovels separated, substantially as described.

8. In a plant-setter, the combination with a reservoir having a valved opening in the lower end thereof, and a tapering semicircular shovel rigidly secured to said reservoir, of a tapering semicircular shovel pivotally secured to said first-mentioned shovel and having a point extending beyond that of the first-mentioned shovel, a tangential lip or extension along one side edge of each of said shovels and means for automatically holding the points of said shovels separated, substantially as described.

9. In a plant-setter, the combination with a reservoir having a valved opening in the lower end thereof and a tapering semicircular shovel rigidly secured thereto, of a tapering semicircular shovel pivotally secured to said first-mentioned shovel and having a point extending beyond that of the first-mentioned shovel, a spring pressing upon said pivoted shovel above the pivot thereof and a bail or extension on said pivoted shovel, substantially as described.

Subscribed and sworn to on the 14th day of June, A. D. 1898.

JOSEPH H. MASTERS.

Witnesses:
W. R. OMOHUNDRO,
C. L. WOOD.